(12) United States Patent
Liu

(10) Patent No.: US 6,188,457 B1
(45) Date of Patent: Feb. 13, 2001

(54) MULTI-DOMAIN LIQUID CRYSTAL DISPLAY HAVING BUMP STRUCTURES WHICH UNEVEN HEIGHT OVERLAID BY A VERTICALLY ALIGNED ORIENTATION LAYER

(75) Inventor: Hong-Da Liu, Chu Pei (TW)

(73) Assignee: Industrial Technology Research Institute, Hsinchu Hsien (TW)

(*) Notice: Under 35 U.S.C. 154(b), the term of this patent shall be extended for 0 days.

(21) Appl. No.: 09/298,946

(22) Filed: Apr. 26, 1999

(51) Int. Cl.$^7$ .................................................. G02F 1/1337
(52) U.S. Cl. ........................ 349/124; 349/125; 349/129
(58) Field of Search ..................... 349/125, 129, 349/160, 124, 123, 158

(56) References Cited

U.S. PATENT DOCUMENTS

| | | | |
|---|---|---|---|
| 4,232,947 | * 11/1980 | Funada et al. ....................... | 349/123 |
| 4,536,059 | *  8/1985 | Van Den Berk ...................... | 350/333 |
| 4,693,559 | *  9/1987 | Baeger ................................. | 350/334 |
| 5,438,421 | *  8/1995 | Sugawara et al. ................... | 349/123 |
| 5,589,963 | * 12/1996 | Gunning, III et al. .............. | 349/119 |
| 5,719,651 | *  2/1998 | Okada et al. ........................ | 349/144 |
| 5,786,878 | *  7/1998 | Kim ..................................... | 349/129 |
| 5,831,704 | * 11/1998 | Yamada et al. ..................... | 349/124 |

OTHER PUBLICATIONS

Lien et al., "Ridge and Fringe–Fidel Multi–Domain Homeotropic LCD", SID SYM, vo. 29, p. 1123, 1998.*

Takeda et al., "A Super–High–Image–Quality Multi–Domain Vertical Alignment LCD by New Rubbing–Less Technology", SID SYM, vo. 29, p. 1077, 1998.*

* cited by examiner

Primary Examiner—Walter J. Malinowski
(74) Attorney, Agent, or Firm—McDermott, Will & Emery

(57) ABSTRACT

The present invention includes a pair of light polarizers. An pair of transparent substrates are formed between the pair of light polarizer. A compensator is formed on the analyzer. A bump structure is formed above the lower substrate. A orientation layer is formed on the bump structure and the substrate. The bump structures are formed on at least one of the pair of glass substrate to provide pre-titled angle for liquid crystal molecules filled between the pair of glass substrate, wherein the bump structure includes inclined surfaces, the heights of the two ends of the bump structure are different.

5 Claims, 8 Drawing Sheets

Mask 1

Mask 2

MULTI-DOMAIN LIQUID CRYSTAL DISPLAY HAVING BUMP STRUCTURES WHICH UNEVEN HEIGHT OVERLAID BY A VERTICALLY ALIGNED ORIENTATION LAYER

CROSS REFERENCE TO RELATED APPLICATION

This following copending U.S. patent application Ser. No. 09/009,184 filed Jan. 20, 1998 and entitle "WIDE VIEWING ANGLE LIQUID CRYSTAL DISPLAY" assigned to the assignee of the present invention is related to the present invention.

FIELD OF THE INVENTION

The present invention relates to a method of making liquid crystal display (LCD), and more specifically, to a method of forming a LCD with a wide viewing angle.

BACKGROUND OF THE INVENTION

Recently, personal data assistant (PDA) and notebook are remarkably progressing. The demanded requirements of the displays for portable use are light weight and low power consumption. Thin film transistor-liquid crystal display (TFT-LCD) can meet the above requirements and is known as the display required for the high pixel density and quality. In general, the TFT-LCD includes a bottom plate formed with thin film transistors and pixel electrodes and a top plate formed with color filters. The liquid crystal is filled between the top plate and the bottom plate. In each unit pixel, a capacitor is provided which is formed by virtue of the TFT serving as the switching element of the unit pixel. When the data voltage is applied to the TFT, the arrangement of the liquid crystal molecules is change, thereby changing the optical properties and displaying the image.

In general, the viewing angle and the color performance are very important issues for the design of the LCD. A color filter (CF) plate is used in the LCD to show the colored portion of the screen. One of the trends for the LCD technology is to improve the viewing angle of the LCD. However, the viewing angle and contrast ratio of LCD are still insufficiently applied to products having large screen. One of an article relating to a vertical-alignment-mode LCD can be seen in SID'97 DIGEST p845~p848, proposed by K. Ohmuro, S. Kataoka, T. Sasaki and Y. Koike. In the reference, the VA-LCD(vertically aligned LCD) has been implemented by optimizing a vertically aligned mode with a domain-divided structure and an optical compensator. This vertical-alignment-mode LCD has a wide viewing angle over 70°, a fast response (<25 ms), and a high contrast ratio of over 300. However, it still suffers some drawbacks. For example, the formation of the two-domain structure needs the mask rubbing process, which is complicated and expensive. The rubbing process also produces ESD (Electrostatic Discharge) problem and particles. In addition, the mask rubbing will lead to a result of image sticking.

SUMMARY OF THE INVENTION

An object of the present invention is to provide a LCD with wide viewing angle.

Another object of the present invention is to provide bump structures in a LCD, thereby providing the pre-titled angle of the liquid crystal molecules.

The present invention includes a pair of light polarizers consisting of a polarizer and an analyzer. A pair of transparent substrate are formed between the pair of light polarizers. A compensator is formed on the analyzer. Bump structures are formed above the substrate. The liquid crystal molecules have larger pre-titled angle that are formed on the bump structure having predetermined lending directions. The bump structures are formed on at least one of the pair of substrate to provide pre-titled angle for liquid crystal molecules filled between the pair of glass substrate, wherein the bump structure includes inclined surfaces, The heights of the two ends of the bump structure are different. Orientation layers are formed over the pair of glass substrate and over the bump structures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention will be described in detail with reference to drawings. The present invention is to provide a method of increasing viewing angle on a two-domain Homeotropic LCD with a compensator. It can be designed for multi-domain structure. The present invention uses two-domain structure as an example. A bump structure is employed in the present invention to achieve aforesaid purpose. The detail processes will be described as follows.

Figure 1:
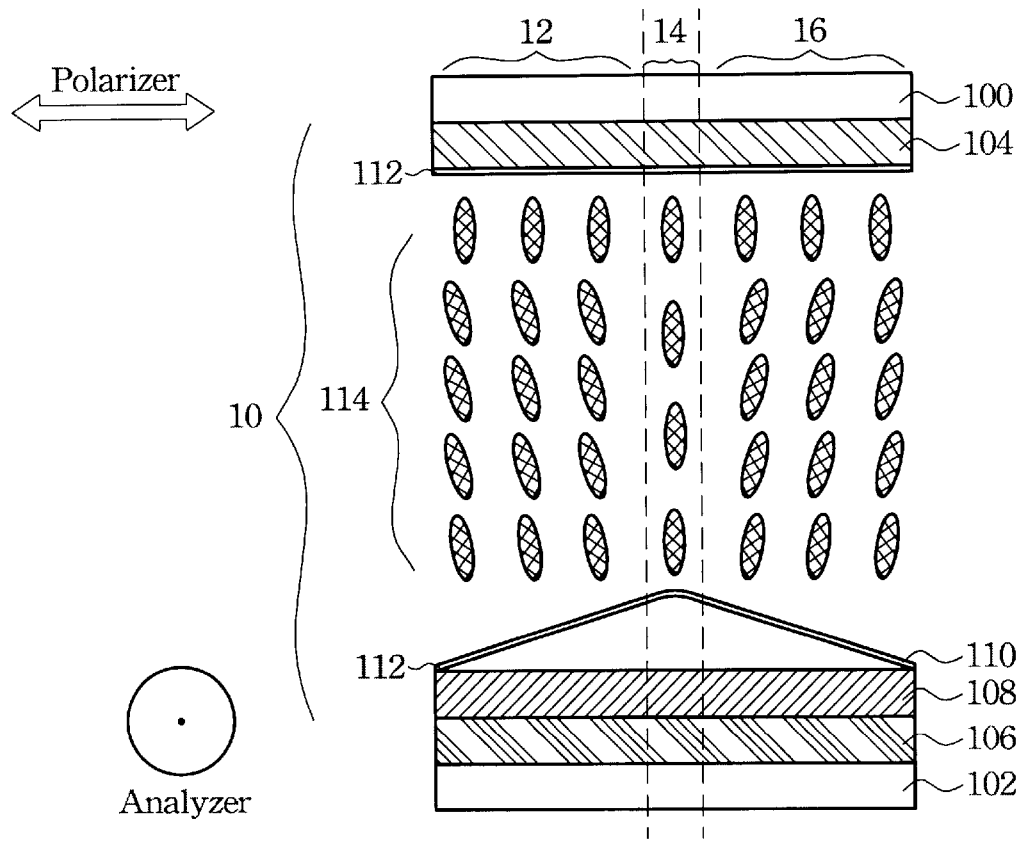
FIG. 1 is cross sectional view of a liquid crystal display (LCD) in accordance with the present invention.

FIG. 1 is a scheme showing a panel structure of a two-domain Homeotropic LCD with a compensator. The liquid crystal display includes a pair of light polarizers consisting of a polarizer 100 and an analyzer 102. The polarizer and analyzer 102 are arranged such that the optic axes of the pair of polarizers are with each other. That is, in the absence of anything else between them, light passing through the polarizer 100 would be absorbed by the analyzer 102, and vice versa. An upper transparent insulating substrate 104, such as glass or the like,) is formed under the polarizer 100. A compensator (or a plurality of) 106 is (are) formed on the analyzer 102, or the compensators are formed on the pair of the light polarizer. The compensator 106 is used to reduce the viewing-angle dependence light leakage. A lower substrate 108 is located above the compensator 104. The lower substrate is composed of transparent material such as glass that is similar to the upper substrate 104. Transparent conductive layer including indium tin oxide (ITO) thin films run orthogonal to one another and are located on the bottom surface of upper substrate 104 and the top surface of the lower substrate 108 (or on the bump structure 110), respectively. A bump structure 110 is formed at least one of said pair of glass substrate. FIG. 1 shows that the bump structure 110 is formed above the lower substrate 108. The detailed description of the bump structure 110 will be seen later.

Two orientation layers 112 are respectively coated on the surfaces of the upper substrate 104 and the bump structure 110. In general, the function of the layers is to control the orientation of the liquid crystal molecules. The orientation layers 112 is formed of polyimide or polyimide acid. Liquid crystal molecules 114 is filled and confined between the upper substrate 104 and the lower substrate 108. Preferably, the liquid crystal material 114 is formed of negative Homeotropic liquid crystal molecules. The Homeotropic liquid crystal molecules together with substrates to form a vertical aligned cell, as depected.

The liquid crystal molecules 114 are nematic orientated, and there are two domains 12, 16 with an overlap region 14 formed between the domains 12, 16 in one pixel. The tilt direction (azimuthal) of liquid crystal molecules in the overlap region 14 projected on the substrate has an angle $\phi$ that is not equal to 90 degrees (it can be greater or less than 180 degrees) with respect to the tilt direction of the liquid crystal molecules in domains 12 and 16.

Figures 2, 3:
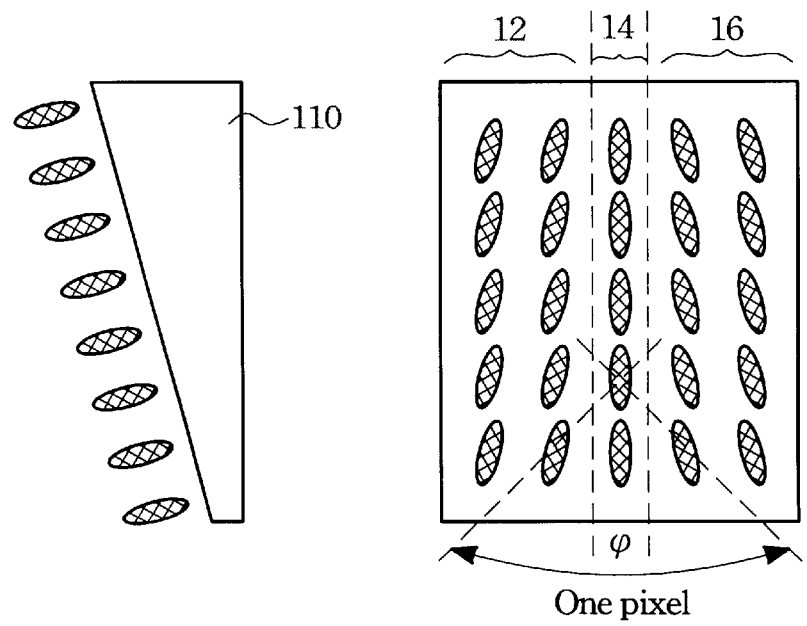
FIG. 2 is a top view of a liquid crystal display in accordance with the present invention.
FIG. 3 is a side view of a liquid crystal display in accordance with the present invention.

In ON state, the color dispersion is small due to the liquid crystal molecules are nematic orientated. The present invention also features the advantage of large gray-scale viewing angle with no inversion. Referring to FIG. 2, it shows a fragmentary top view of the two-domain VA(Vertical Aligned) mode LCD with compensator. The tilt angle $\phi$ that project on the azimuthal of substrate between the orientation of liquid crystal molecules in domains 12 and 16 are not equal to 180 degree (it can greater or less than 180 degree). In this embodiment, the liquid crystal molecules in each domain are orientated nearly perpendicular to the surface of substrates with a little pre-tilted angle to the normal of the substrates when an electrode field is not applied (OFF state). The tilt-angle of the liquid crystal molecules that project on the azimuthal of the substrate between the orientation of liquid crystal molecules in two domains is not equal to 180 degree.

Figure 4:
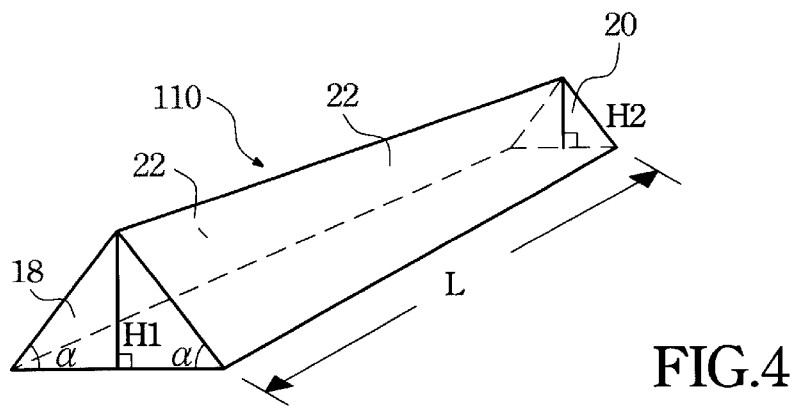
FIG. 4 is a scheme illustrating a bump structure in accordance with the present invention.
Figure 5A:
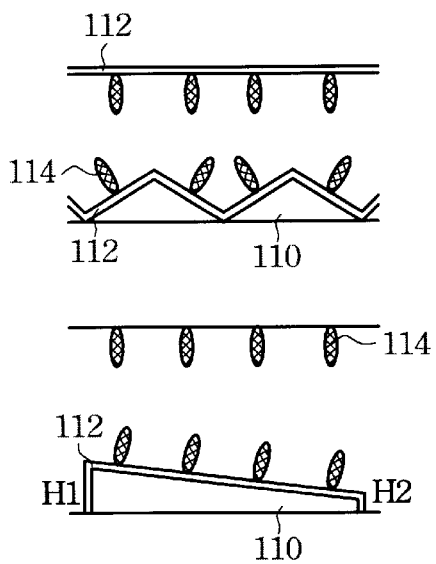
FIG. 5A–FIG. 6B are cross sectional views of a LCD having the bump structure in accordance with the present invention.
Figure 5B:
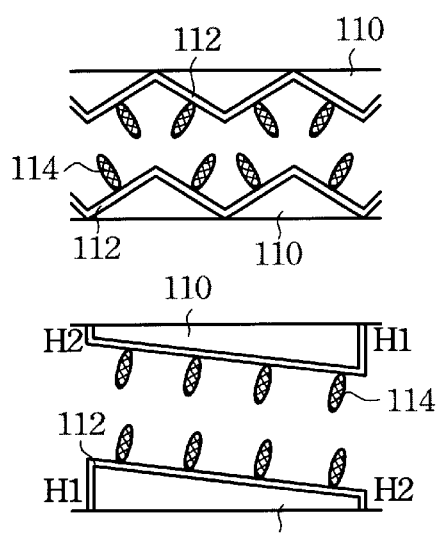
Figure 6A:
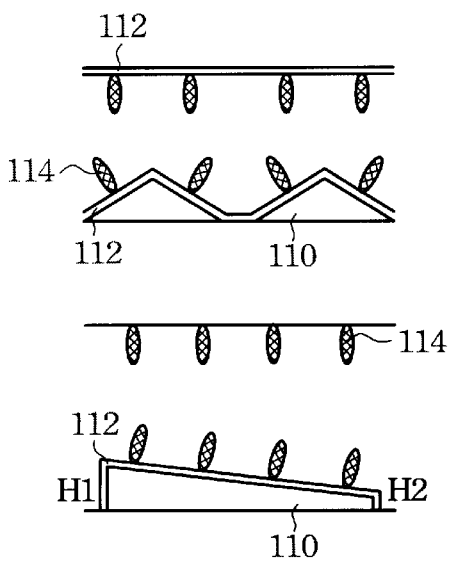
Figure 6B:
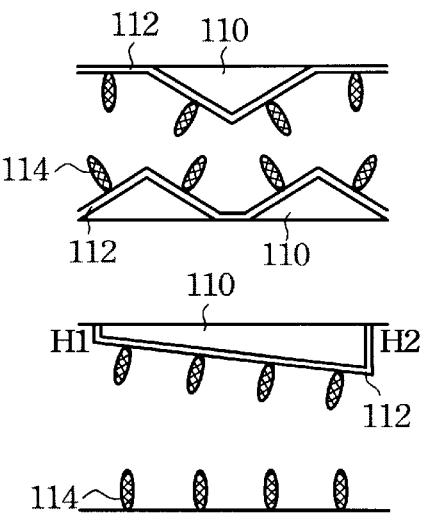

The pre-tilted angle of the two-domain vertical aligned liquid crystal molecules in domains 12, 16 and the overlap area 14 before the ON state strongly effects the response time of the liquid crystal molecules. The bump structure 110 according to the present invention is used for further achieving this response characteristic of domain divided VA-cells. FIG. 3 is the side view of the bump structure 110, and the FIG. 4 is a scheme illustrating the three-dimension picture of the bump structure 110. The bump structure 110 can be formed of positive or negative photoresist. Preferably, the bump structure 110 is configured so that the top surface of the structure lends to a desire direction, thus the liquid crystal molecules formed over the bump structure 110 has a larger pre-titled angle. For example, the bump structure 110 is constructed by two side surfaces 18, 20 and two inclined surfaces 22. The side surfaces 18, 20 of the bump structure are configured as a triangle shape. In the preferred embodiment, the side surfaces 18, 20 are formed with different height H1 and H2 such that the inclined surfaces 22 of the bump structure 110 will lean to a desired direction due to H1 higher than H2. In the other words, the height of the two ends of the bump structure are different. The terminals of each inclined surfaces 22 connect to the side surfaces 18, 20, respectively. The oblique angle of the inclined surface 22 from the surface of the substrate is indicated by angle $\alpha$.

FIGS. 5A, 5B and FIGS. 6A, 6B are the embodiments of the present invention. The bump structure 110 can be formed over the surface of one of the substrates only or over both substrates. The FIGURES show the liquid crystal molecules having larger pre-titled angle that are formed on the bump structure 110 having predetermined lending directions. Apparently, the bump structure 110 can provide the liquid crystal molecules with larger pre-titled angle. Further, the bump structures 110 can be separated or not.

Figure 7:
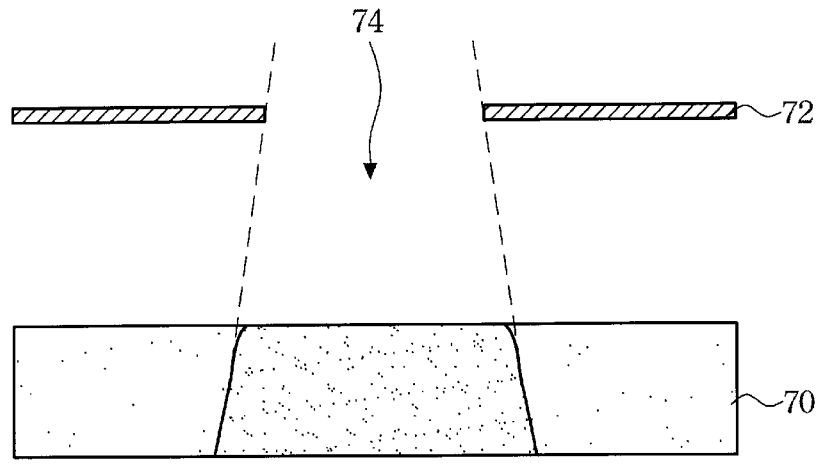
FIG. 7–FIG. 9 are the cross sectional view of a substrate illustrating the steps to form the bump structure in accordance with the first method of the present invention.
Figure 8:
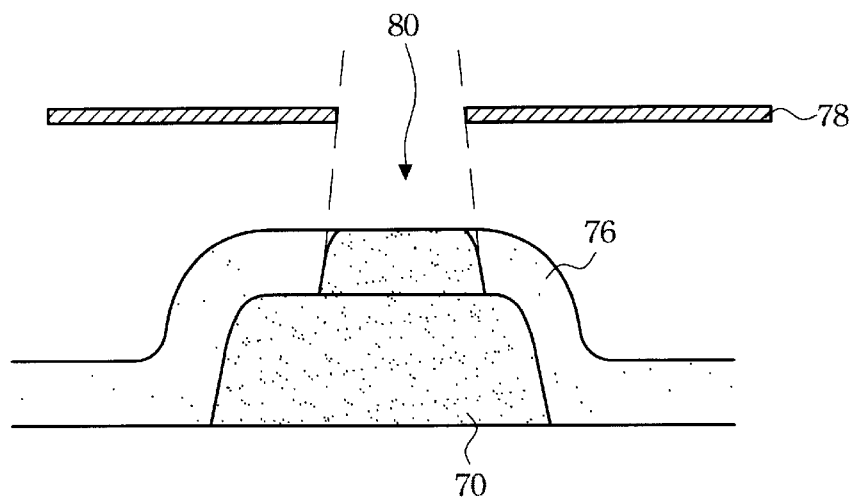
Figure 9:
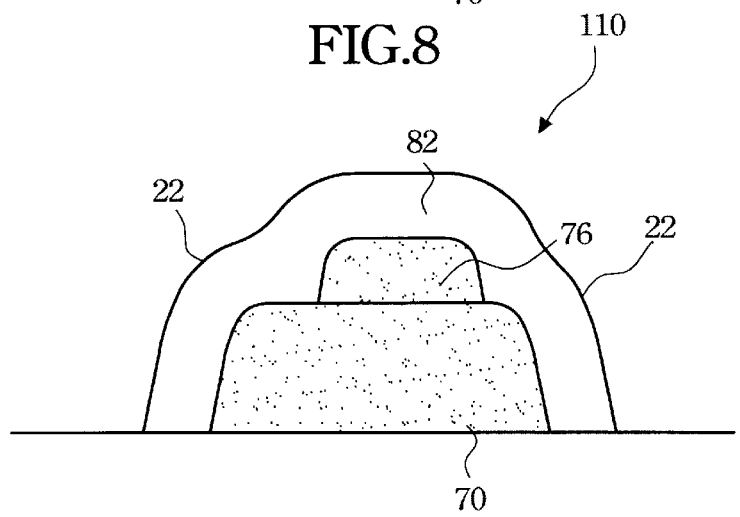

The formation of the bump structure 110 can be seen as follows. The first method is the use of multi-photomask to form the bump structure 110. Turning to FIG. 7, a first negative photoresist 70 is coated on a substrate. Then, the negative photoresist is exposed by an illumination using a first photomask 72 having a first opening 74. The first negative photoresist 70 is developed using conventional method. The exposed portion of the first negative photoresist 70 will remain on the substrate as known in the art. If the distant between the first photomask 72 and the first negative photoresist 70 is increased, then the developed first negative photoresist 70 has slope profile due to the optical interference. Next, turning to FIG. 8, a second negative photoresist 76 is coated on the substrate and the first negative photoresist. Subsequently, the second negative photoresist 76 is exposed by a second photomask 78 having a second opening 80. The opening wide of the second opening 80 is narrower than the one of the first opening 74. Further, the second opening 80 is aligned to the remained first negative photoresist 70 but shifts a space to one side of the first negative photoresist 70. Similarly, the second negative photoresist has slope profile after develop. The aforementioned steps can be repeated several times depend on the necessary. Next FIG. 9, an overcoat layer 82 is formed on the resulting structure, thereby forming the bump structure 110 having a inclined surfaces 22, as shown in FIG. 4.

Figure 10:
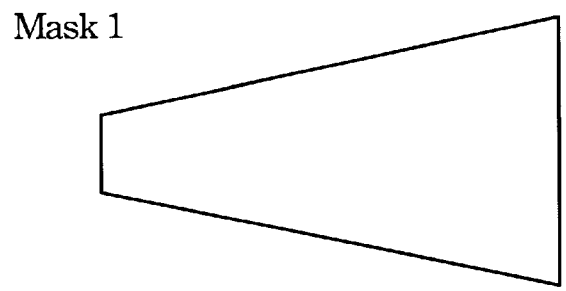
FIG. 10 shows the photomask for forming the bump structure in accordance with the first embodiment of the present invention.
Figure 10:
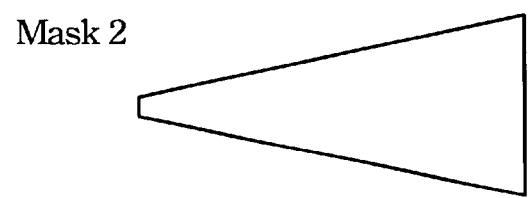
Figure 11:
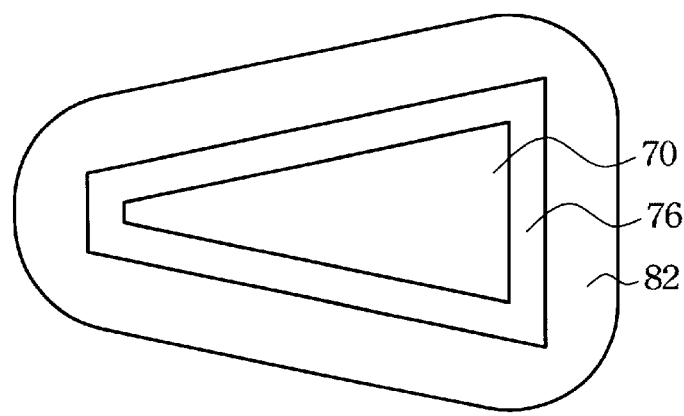
FIG. 11 is the top view of the bump structure in accordance with the first embodiment of the present invention.

The more steps of the photolithography is used, the smoother the profile is. The shape of the opening of the photomask is shown in FIG. 10. The shape of the opening is preferably trapezoid shape. The configuration can obtain the shape of the side surfaces 18, 20 of the bump structure 110 are similar to trapezoid shapes. The top view of the bump structure is shown in FIG. 11.

Figure 12:
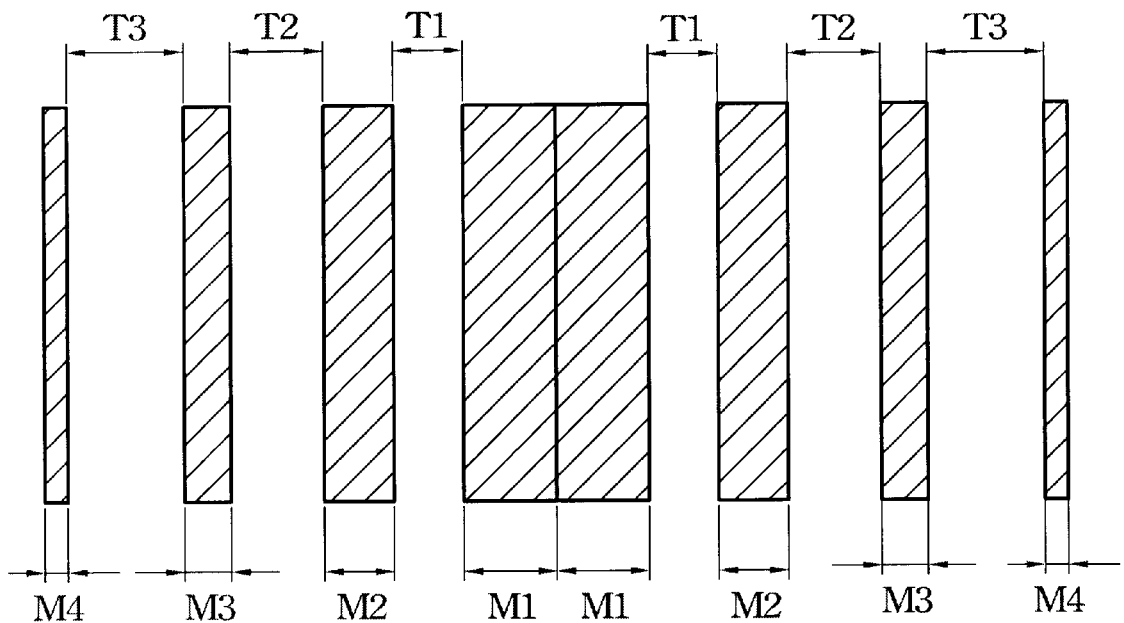
FIG. 12 is a scheme showing a design of a photomask for forming the bump structure in accordance with the second method of the present invention.
Figure 13:
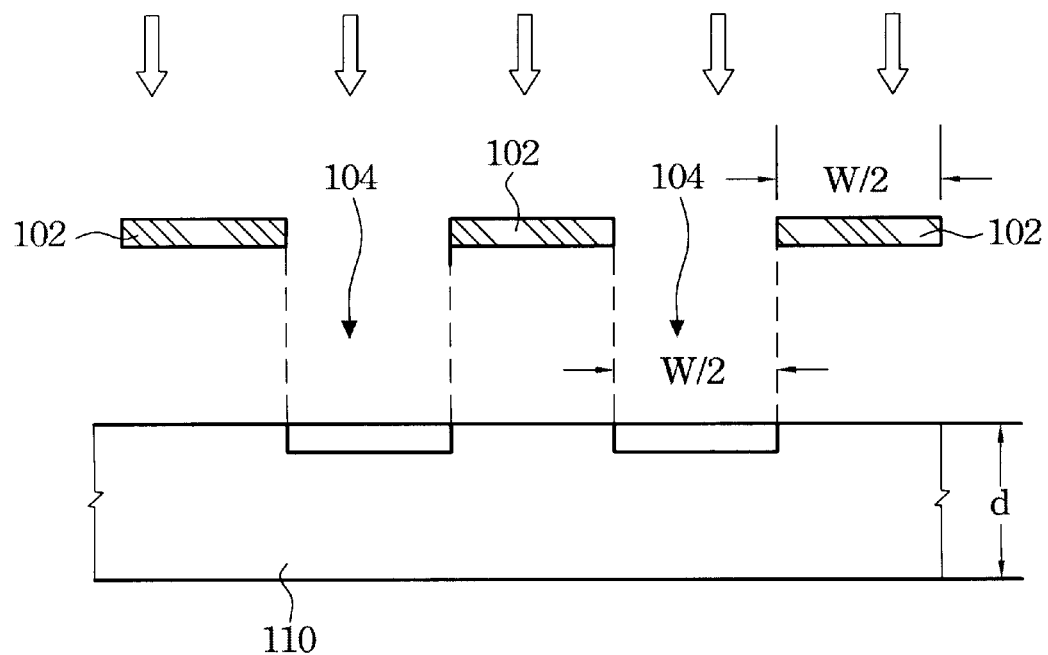
FIG. 13–FIG. 17 are the cross sectional view of a substrate illustrating the steps to form the bump structure in accordance with the third embodiment of the present invention.
Figure 14:
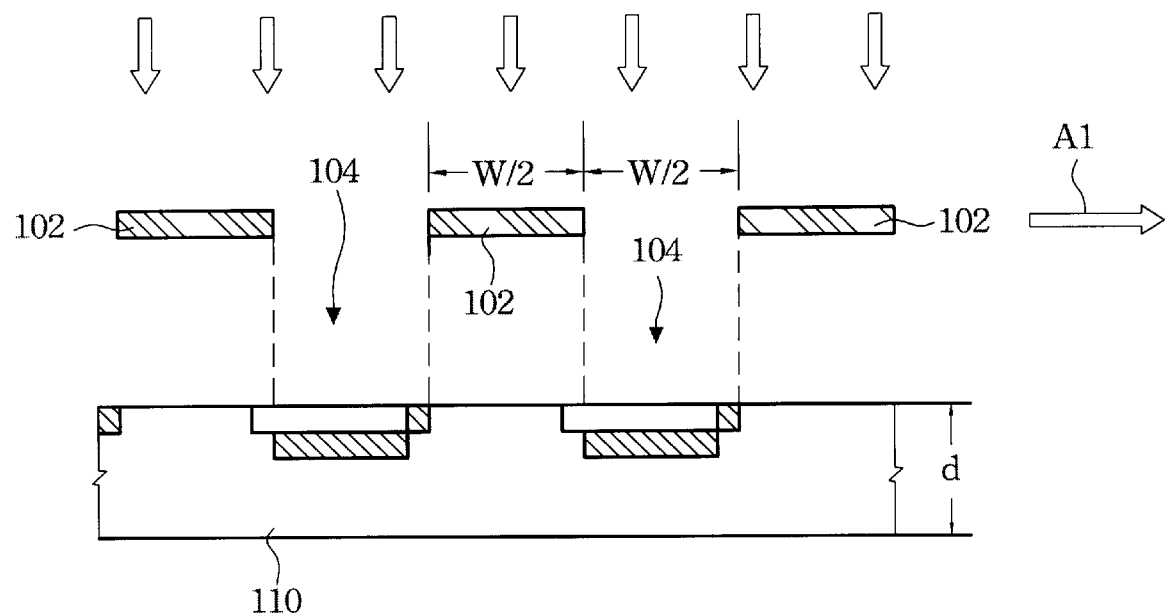
Figure 15:
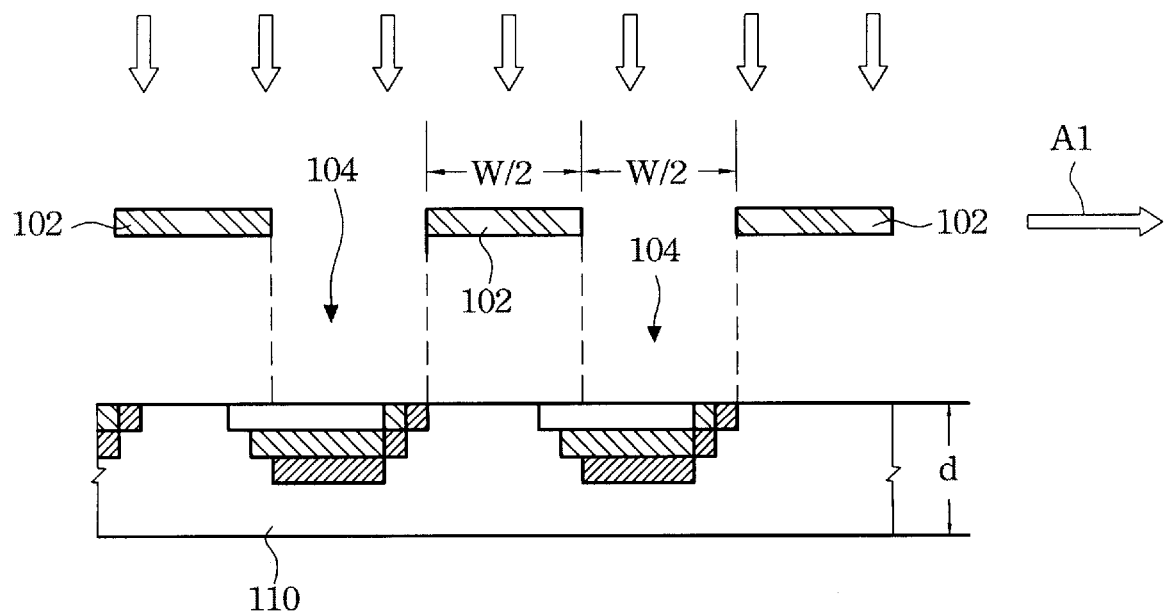
Figure 16:
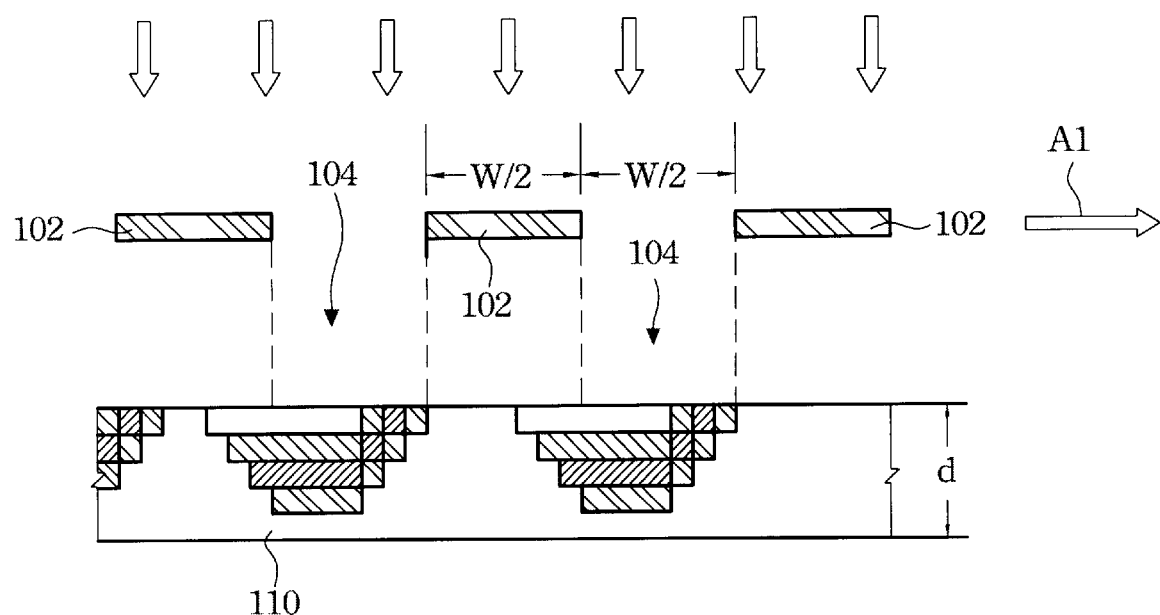

The photomask shown in FIG. 12 can be used to construct the bump structure on the substrate. The photomask is divided two major portions that are mirror image with each other. The wides of the openings of the mask are increased from the central portion to the edge portion. That is the wide T3 that is wider than the wide T2, the T2 is also wider than T1. Further, the spaces between two adjacent openings is decreased from the central portion to the edge portion, namely, the space M1 is wider than M2 that is wider than M3. The space M3 is wider than M4. An optical interference is introduced in the second method. The bump structure can be formed by one exposure.

The third method according to the present invention can be seen. The method uses one photomask and multi-exposure steps. The photomask having a plurality of openings with equal wide formed therein. The key of the method is to shift the photomask to a direction vertical to the normal line of the surface of the photoresist after each exposure, the direction is indicated by an arrow in the drawings. The exposed portions of the photoresist have profiles similar to triangle shape after the aforesaid multi-exposure steps. This can be explained as follows.

The method for forming the bump structure includes:

Step (a): exposing a photoresist by using a photomask having opening formed therein; Step (b): shifting the photomask to a spacer along a direction vertical to a normal line of a surface of the photoresist; Step (c) repeating the step (a) and the step (b) for a desired cycle; (d) developing the photoresist. The structure according to FIG. 1 to FIG. 6 can be obtained by using the mask shown in FIG. 10.

Figure 17:
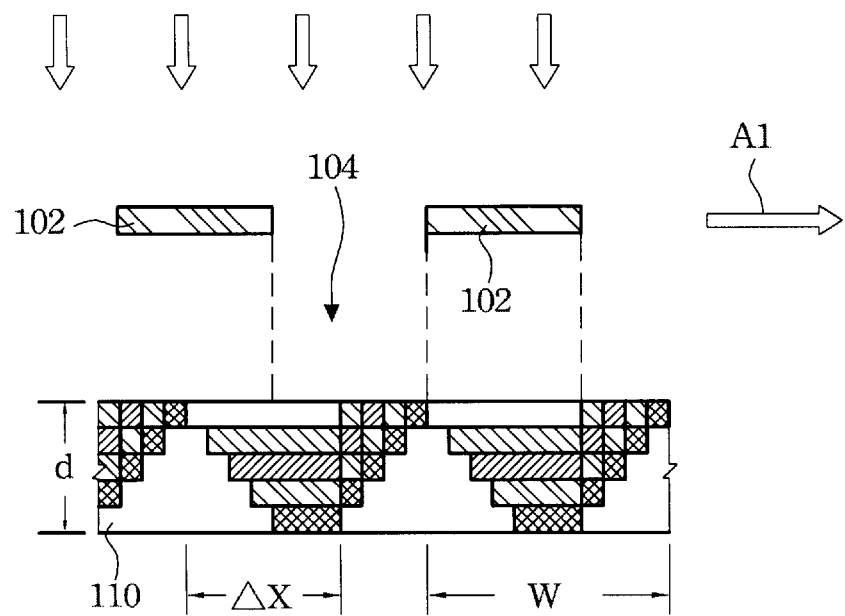
Figure 18:
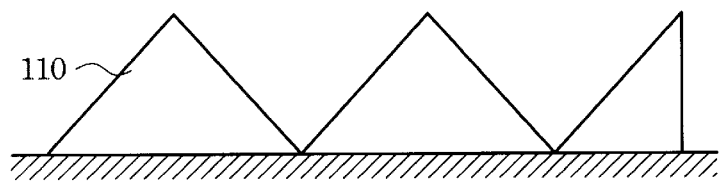
FIG. 18–FIG. 20 are the cross sectional view of a substrate illustrating the configuration of the bump structure formed by the embodiment method of the present invention.
Figure 19:
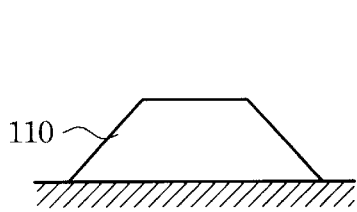
Figure 20:
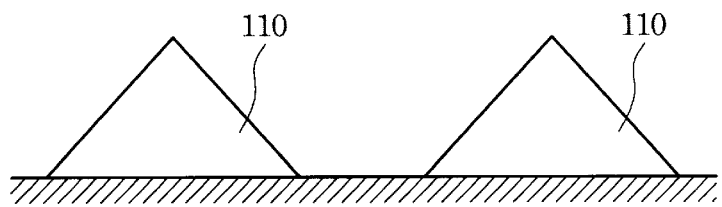

In order to have a clear description, the method uses five exposure steps as an example. However, it is not limited by the limitation, namely, it can be done by any time of exposure steps. Referring to FIGS. 13 to 17, a first exposure is performed on the photoresist 110 with aforesaid photomask 102. After the step is $t_1$ seconds. The photomask has a plurality of openings 104. The photoresist 110 can be positive photoresist, negative photoresist, polyimide or polyamie. The result of the use of the negative photoresist is an inverse structure of the use of the positive photoresist a known in the art. The present invention uses the positive photoresist as the embodiment. Then, the photomask 102 is shifted to a spacer toward the direction indicated by the arrow A1. Next, a second exposure step is performed, the positive photoresist 110 is exposed by illumination through the openings 104 of the photomask 102. Similarly, the photomask 102 is shifted again with a space that is the same with the one of the last shift. Assume that the step is completed at $t_2$ seconds from the beginning. Thus, the second exposure is carried out for $(t_2-t_1)$ seconds. Similarly, the third, forth and fifth exposure steps is performed for $(t_3-t_2)$, $(t_4-t_3)$ and $(t_5-t_4)$ seconds, respectively. The following steps repeat the procedure as mentioned above, as shown in FIGS. 15–17. The exposed portion of the photoresist 110 is illustrated in FIG. 17. The exposed depth (de) of the exposed portion can be represent by $de(t_i)=(d/5)x_i$, wherein the d is the thickness of the photoresist 110, wherein the $x_i$ indicates the total shift space after the ith exposure step. The result after develop is shown in FIG. 17. The final bump structure 110 is completed by the use of the mask having an opening wide W/2 and having the spacer between two adjacent openings is also W/2. Further, the total shift spacer ($\Delta x$) is about W/2, if each shift is about W/10. Under this condition, the bump structure is formed with a wide W. FIG. 19 and FIG. 20 are other profiles of the bump structure under different total shift space, that is ($\Delta x$)<W/2 and ($\Delta x$)>W/2.

Figure 21:
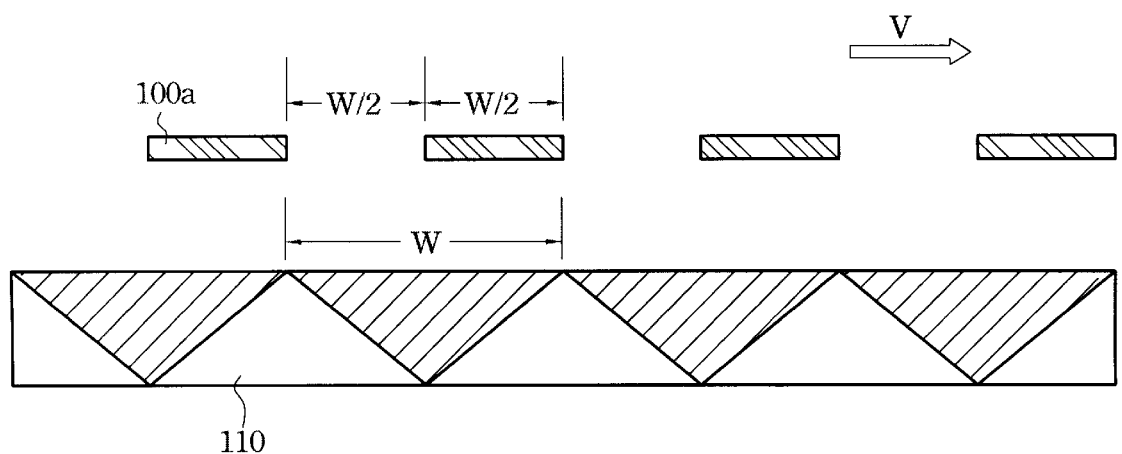
FIG. 21 is the cross sectional view of a substrate illustrating the steps to form the bump structure in accordance with the third embodiment of the present invention.

Another method is similar to the last method. Turning to FIG. 21, the photomask 100a is the same with the last embodiment. The only difference is the photomask 100a is removed in a direction indicated by the arrow with a constant velocity (V). The motion direction is also parallel to the substrate surface. The result of FIG. 21 is that the photomask 100a moves with a velocity V=(W/2)/t. The bump structure can also be defined as shown in the FIG. 21 and FIG. 22 by adjusting the velocity of the photomask 100a.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A structure of a liquid crystal display, said structure comprising:
    at least one light polarizer;
    a compensator formed on one of said at least one light polarizer;
    a pair of substrates, said substrate pair comprising at least one transparent substrate, wherein one of said pair of substrates is formed on said compensator and the other one of said pair of substrates is formed on another one of said at least one light polarizer;
    bump structures formed on at least one of said pair of substrates to provide pre-tilted angle for liquid crystal molecules filled between said pair of substrates, wherein said bump structures comprise inclined surfaces, wherein a first height of a first end of said bump structures is different from a second height of a second end of said bump structures, said bump structure comprises side surfaces; and
    vertically aligned orientation layers over said pair of substrates and over said bump structures.

2. The structure of claim 1, wherein said vertically aligned orientation layers are formed of polyimide or polyimide acid.

3. The structure of claim 1, wherein said at least one light polarizer comprises a pair of cross polarizers.

4. The structure of claim 1, wherein said liquid crystal molecules are negative dielectric and homeotropically aligned, and there are at least two domains with an overlap region formed between said at least two domains in one pixel.

5. The structure of claim 4, wherein the tilt direction (azimuthal) of said liquid crystal molecules in said overlap region projected on the substrate has an angle that is greater or less than 90 degrees with respect to the tilt direction of said liquid crystal molecules in said at least two domains.

* * * * *